United States Patent [19]

Johnson

[11] 4,390,817
[45] Jun. 28, 1983

[54] INTEGRATABLE CRT SPOT CUT-OFF NETWORK

[75] Inventor: Fred D. Johnson, Evanston, Ill.

[73] Assignee: Zenith Radio Corporation, Glenview, Ill.

[21] Appl. No.: 238,771

[22] Filed: Feb. 27, 1981

[51] Int. Cl.³ .................... H01J 29/70; H01J 29/72
[52] U.S. Cl. ............................. 315/384; 315/381; 358/220
[58] Field of Search ............... 315/381, 384; 358/220

[56] References Cited

U.S. PATENT DOCUMENTS 4,056,758 11/1977 Schaas ............................ 315/381

FOREIGN PATENT DOCUMENTS 2423726 11/1975 Fed. Rep. of Germany ...... 315/384
968719 9/1964 United Kingdom ............... 315/381
2021364 11/1979 United Kingdom ............... 315/381

Primary Examiner—Theodore M. Blum

[57] ABSTRACT

An integratable CRT spot cut-off network is described for use in a television receiver. The network establishes a reference current for biasing up the receiver's $G_1$ grid when the supply voltage comes up, and a bypass capacitor coupled to the grid charges toward the supply voltage. When the receiver is turned off, the network terminates the reference current as the supply voltage starts to collapse and prevents the bypass capacitor from discharging. The charge stored on the capacitor reverse biases the grid to cut off the receiver's beam current.

4 Claims, 2 Drawing Figures

INTEGRATABLE CRT SPOT CUT-OFF NETWORK

BACKGROUND OF THE INVENTION

This invention is directed to a network for automatically and quickly cutting off the beam current of a television receiver's CRT (cathode ray tube) when the receiver is turned off.

When a television receiver is turned off, its vertical and horizontal deflection voltages collapse rapidly. However, the cathodes of the receiver's CRT continue to emit electrons for a short time because of their elevated temperatures. Consequently, if the CRT's electron guns are not biased off, the residual emission of the cathodes produces a visible spot near the center of the CRT. Prolonged and repeated generation of such a spot may permanently burn the CRT where the spot is developed.

To avoid burning the CRT, it is common to include a network for automatically reverse biasing each electron gun when the receiver is turned off, thereby to cut off any electron beam resulting from residual cathode emission. A typical network which provides such beam cut-off is shown in FIG. 1, to which reference is now made.

The illustrated network includes a pair of resistors $R_1$ and $R_2$ and a diode $D_1$ which are serially connected between a 250 volt supply and ground. The junction between the resistors $R_1$ and $R_2$ is coupled to the grid $G_1$ of an electron gun to provide a bias of about plus 25 volts on the grid during normal receiver operation. A capacitor $C_1$ is coupled between ground and the grid to provide an A.C. bypass.

To reverse bias the grid when the receiver is turned off, a large capacitor $C_2$ is coupled between the diode $D_1$ and the 250 volt supply. This capacitor charges with the polarity indicated to a value of about 250 volts in normal receiver operation. When the receiver is turned off, the 250 volt supply collapses, but the diode $D_1$ prevents the capacitor $C_2$ from discharging rapidly. Hence, the charge stored on the capacitor $C_2$ reverse biases the $G_1$ grid to turn its electron gun off quickly.

Although the illustrated network and others like it perform satisfactorily, they are impractical to integrate, primarily because of the need for two capacitors. This drawback renders such conventional networks undesirable for use in modern receivers.

OBJECTS OF THE INVENTION

It is a general object of the invention to provide an improved CRT spot cut-off network.

It is a more specific object of the invention to provide an integratable CRT spot cut-off network which employs but a single capacitor.

BRIEF DESCRIPTION OF THE FIGURES

The objects stated above and other objects of the invention are set forth more particularly in the following detailed description and in the accompanying drawings, of which.

DESCRIPTION OF THE PREFERRED EMBODIMENT

Figure 1:
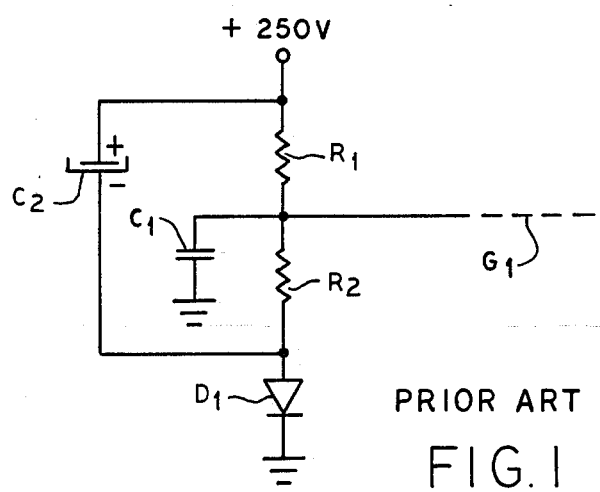
FIG. 1 shows the conventional spot cut-off network described above.
Figure 2:
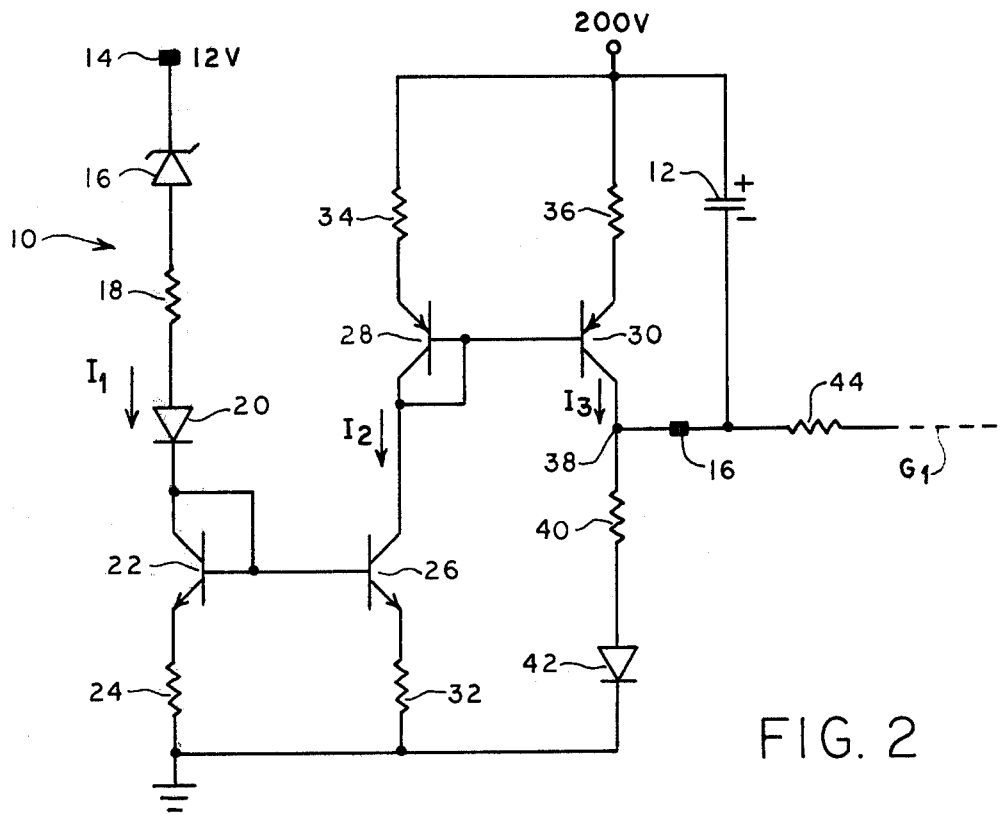
FIG. 2 shows a spot cut-off network according to the invention.

Referring now to FIG. 2, a spot cut-off network 10 is shown which illustrates a preferred embodiment of the invention for use in a television receiver. All components of the illustrated network, with the exception of a capacitor 12 and a resistor 44, may be included on an IC (integrated circuit) chip along with other circuitry. Pins 14 and 16, respectively, indicate pins on the IC chip for accessing an external supply voltage and for coupling the integrated portion of the network to the capacitor 12 and to the $G_1$ grid of an electron gun.

The network includes a current generator comprising a zener diode 16 coupled in series with a resistor 18, a diode 20, a transistor 22 and a resistor 24. The transistor 22 is connected as a diode with its collector coupled to its base for carrying a reference current $I_1$ through the transistor 22 and the resistor 24.

A supply voltage, 12 volts in this embodiment, is coupled to the pin 14 and the resistor 24 is coupled to a reference potential which is shown as ground. The zener diode 16 is selected to have a voltage breakdown point which is somewhat lower than the supply voltage received at pin 14. For example, a seven volt zener may be used in the case where the pin 14 receives a 12 volt supply. Thus, when the receiver is energized and the voltage at pin 14 comes up to its nominal design level of 12 volts, the zener 16 breaks down and the reference current $I_1$ flows. As described in more detail below, this reference current is used to establish a predetermined forward bias on the $G_1$ grid.

Coupled to the transistor 22 is a current mirror comprising transistors 26, 28 and 30 and resistors 32, 34 and 36. The transistor 26 is coupled via its base to the base of the transistor 22 and the resistor 32 is coupled between ground and the emitter of transistor 26.

The collector of transistor 26 is coupled to the diode-connected PNP transistor 28, the emitter of which is coupled to a 200 volt supply via the resistor 34. Thus, the transistor 26 establishes a current $I_2$ through itself and the transistor 28 when the current $I_1$ is present. Preferably, the currents $I_1$ and $I_2$ are made to match each other by selecting the resistors 24 and 32 to be of substantially equal value.

The transistor 30 is another PNP transistor whose base is coupled to the base of the transistor 28 and whose emitter is coupled to the 200 volt supply via the resistor 36. Hence, the transistor 30 establishes a current $I_3$ toward a node 38 whenever the current $I_2$ exists. Preferably, the resistors 35 and 36 are matched so that the currents $I_2$ and $I_3$ are substantially equal to each other. In this manner, the current $I_1$ is mirrored to the node 38.

Coupled between ground and the node 38 is a biasing resistance 40 and a diode 42. The $G_1$ grid is also coupled to the node 38 via a resistor 44 and the pin 16. In addition, one end of the capacitor 12 is coupled to the node 38 via the pin 16 and its other end is coupled to the 200 volt supply.

Assuming that the 12 volt and 200 volt supplies are on, the transistor 30 injects the current $I_3$ into the resistance 40 to develop a forward bias of plus 25 volts, for example, across the resistance 40 and the diode 42. That bias is coupled to the $G_1$ grid via the resistor 44 to enable the receiver's electron gun or guns to operate normally.

At the same time, the capacitor 12 charges toward the 200 volt supply through the diode 42 and the resistance 40. Thus, a charge of the polarity indicated is stored on the capacitor 12.

When the receiver is turned off, the supply voltages begin to collapse, and when the 12 volt supply decreases to about 8.4 volts, the zener diode 16 becomes non-conductive. Hence, the current $I_1$ is extinguished. The currents $I_2$ and $I_3$ are also reduced to zero, the transistor 30 turns off, and the forward bias at node 38 is terminated. The charge on the capacitor 12 remains however, because the capacitor cannot discharge through the transistor 30. Nor can it discharge through the resistance 40 because of the diode 42. Consequently, the charge on the capacitor 12 reverse biases the $G_1$ grid to cut off the electron beam. Eventually, the charge on the capacitor 12 will dissipate, but it will hold the electron beam off long enough to permit the cathode or cathodes to stop emitting electrons.

It will be appreciated that the capacitor 12 serves two functions. It not only serves to reverse bias the grid when the receiver is turned off, but it also acts as an A.C. bypass for the grid.

Although the illustrated embodiment is shown as employing both a 12 volt supply and a 200 volt supply, only one supply may be used if desired. For example, pin 14 may also be coupled to the 200 volt supply, provided a suitable zener diode is used whose breakdown voltage is somewhat lower than 200 volts, such as 150 volts. Of course, 7 volt zener diodes are easier to fabricate in integrated circuits, wherefore, it is more practical to develop the reference current from a 12 volt supply.

Suffice it to say that whatever supply is chosen for coupling to the pin 14, the zener diode should be selected so that it becomes non-conductive when its supply decreases a small, given amount below its nominal design level and before that supply completely collapses. This ensures that the currents $I_1$, $I_2$ and $I_3$ are quickly reduced to zero and that the capacitor 12 quickly turns off the electron beam.

The spot cut-off network described above is readily integrated because it requires no pins for accessing the capacitor 12. The same pin which is required for coupling the $G_1$ grid to the IC chip also accesses the capacitor. Moreover, the illustrated design employs readily integrated devices.

Although the spot cut-off network has been described in terms of a preferred embodiment, it will be obvious to those skilled in the art that many alterations and modifications may be made without departing from the invention. For example, the zener diode need not be coupled between the pin 14 and the resistor 18. The grounded ends of the resistors 24 and 32 may be coupled together and returned to ground through the zener diode and achieve the same result. Many other such modifications will be obvious to those skilled in the art. Accordingly, it is intended that all such modifications and alterations be included within the spirit and scope of the invention as defined by the appended claims.

I claim:

1. In a television receiver which develops at least one supply voltage and which includes a CRT having one or more grids, an improved spot cut-off network for a grid, comprising:

a current generator powered by the supply voltage for establishing a reference current, and responsive to a collapse of the supply voltage for rapidly terminating the reference current;

a biasing resistance having one end thereof coupled to the grid;

a diode coupled between a reference potential and the other end of the biasing resistance;

a capacitor coupled between a supply voltage and said one end of the biasing resistance for bypassing A.C. signals at the grid and for charging toward the latter supply voltage through the biasing resistance and the diode; and transistor means comprising a current mirror adapted to be turned on by and to mirror the reference current into the biasing resistance so as to establish a forward grid bias across the biasing resistance and diode, and adapted to be turned off by the termination of the reference current for terminating the mirrored current and for inhibiting the capacitor from discharging into said transistor means, whereby the charge stored on the capacitor reverse biases the grid when the reference current terminates so that the CRT beam is cut off.

2. A spot cut-off network as set forth in claim 1 wherein the current generator terminates the reference current in response to its supply voltage falling a small, predetermined level below its nominal design level.

3. A spot cut-off network as set forth in claim 2 wherein the current generator includes the series combination of a zener diode, a resistor, and a diode-connected transistor, all connected between a supply voltage and a reference potential, for establishing the reference current in said transistor and for terminating the reference current when the zener diode becomes non-conductive in response to a decrease in the supply voltage.

4. In a television receiver which develops at least one supply voltage and which includes a CRT having one or more grids, an improved spot cut-off network for a grid, comprising:

a current generator including at least a zener diode, a resistor and a diode-connected transistor coupled in series between a supply voltage and ground for establishing a reference current in said transistor and for terminating the reference current when the zener diode becomes non-conductive due to a decrease in the supply voltage;

a current mirror responsive to the reference current for establishing a biasing current;

a biasing resistance and a diode serially coupled between ground and the grid and receiving the biasing current for establishing a forward bias on the grid; and a capacitor coupled between the grid and a supply voltage for charging toward the latter supply voltage through said biasing resistance and diode so that, when the reference current and biasing current terminate, the charge on the capacitor reverse biases the grid to cut off beam current.

* * * * *